(12) United States Patent
Djordjevic et al.

(10) Patent No.: US 8,862,583 B2
(45) Date of Patent: Oct. 14, 2014

(54) PROCESSING A REUSABLE GRAPHIC IN A DOCUMENT

(75) Inventors: Divna Djordjevic, Antibes (FR); Rayid Ghani, Chicago, IL (US)

(73) Assignee: Accenture Global Services Limited, Dublin (IE)

( * ) Notice: Subject to any disclaimer, the term of this patent is extended or adjusted under 35 U.S.C. 154(b) by 311 days.

(21) Appl. No.: 13/230,982

(22) Filed: Sep. 13, 2011

(65) Prior Publication Data

US 2012/0078908 A1 Mar. 29, 2012

(30) Foreign Application Priority Data

Sep. 29, 2010 (EP) .................................... 10306055

(51) Int. Cl.
*G06F 17/30* (2006.01)
*G06K 9/36* (2006.01)

(52) U.S. Cl.
CPC .... G06F 17/30259 (2013.01); G06F 17/30253 (2013.01)
USPC .......................................... 707/737; 382/284

(58) Field of Classification Search
USPC ................. 707/602, 737, 754, 736, 915, 919, 707/999.107; 382/181, 190, 282, 284
See application file for complete search history.

(56) References Cited

U.S. PATENT DOCUMENTS

| 6,697,532 | B1 | 2/2004 | Demko et al. | |
| 7,715,625 | B2 * | 5/2010 | Tagawa et al. | 382/173 |
| 2006/0008151 | A1 * | 1/2006 | Lin et al. | 382/190 |
| 2009/0150359 | A1 | 6/2009 | Masuyama | |
| 2009/0190830 | A1 * | 7/2009 | Hasegawa | 382/165 |

FOREIGN PATENT DOCUMENTS

| EP | 2131297 A1 | 12/2009 |
| FR | 2934694 A1 | 2/2010 |
| WO | 03081533 A2 | 10/2003 |

OTHER PUBLICATIONS

"Slide Image Retrieval: A Preliminary Study", Liew & Kan, JCDL '08, Jun. 16-20, 2008, Pittsburgh PA.
"NPIC: Hierarchical synthetic image classification using image search and generic features", Want & Kan, CIVR, 2006, p. 473-482.
"Taxonomies vs. Dynamic Classification in Interwoven Universal Search", White Paper, Interwoven, Aug. 20, 2007.
Search Report issued in European Patent Appln. S.N. 10306055.4 on Dec. 21, 2010.

* cited by examiner

*Primary Examiner* — Md. I Uddin
(74) *Attorney, Agent, or Firm* — Mannava & Kang, P.C.

(57) ABSTRACT

A method and apparatus are provided for processing a graphic in a document so that the graphic may be reused in a different application than the one it was originally used in. For a given document, a graphic may be identified from within the document and extracted from the document. The extracted graphic may be stored in a suitable storage medium, such as a reusable graphic repository. A structural feature associated with the extracted graphic may also be extracted. The extracted graphic may then be classified based on the extracted structural feature. Furthermore, a method and apparatus are provided for generating a reusable graphic from a document.

12 Claims, 6 Drawing Sheets

PROCESSING A REUSABLE GRAPHIC IN A DOCUMENT

FIELD OF THE INVENTION

The instant disclosure relates to digital asset management and, in particular, to techniques for processing graphics in a document for reuse.

BACKGROUND OF THE INVENTION

Organizations frequently maintain repositories for storing, accessing, and managing digital legacy documents. Each repository is typically equipped with a search engine for parsing the repository and returning a relevant set of documents based on a given query. However, it is often the case that users are not searching the repository for an entire document, but rather, for a relevant piece of content contained within a document. Furthermore, this relevant piece of content could be either textual or non-textual. Non-textual content, referred to as rich media, often includes items such as graphics (e.g., images, charts, graphs, diagrams, maps, etc.), video, audio, etc. Increasingly, users are searching document repositories in an effort to locate rich media contained within a document in order to repurpose that rich media for use in a new application.

For example, in the context of a commercial business setting, an employee charged with completing a new project will likely search their organization's document repository to locate documents that were previously created for similar projects. Oftentimes, the employee will perform the search with the goal of locating a particular type of rich media (e.g., a graphic) suitable for reuse in their current project. However, existing document management systems typically force the employee to engage in a tedious and inefficient process in order to obtain the desired rich media for reuse.

For example, using existing document management systems, an employee would first have to locate a document containing the desired rich media. This exercise is often difficult in itself given the fact that most document repository search engines operate by comparing the queried term(s) against the text of a document and/or textual metadata appended to a document. Because the sought-after rich media is often non-textual by its very nature, the rich media embedded within a document is rarely even considered during the search, leading to less relevant search results. This creates a scenario in which the employee must vet a potentially voluminous set of returned documents in order to identify the particular document(s) actually containing the desired rich media. In the event that the employee is fortunate enough to locate a relevant document, they next have to manually parse that document in order to locate the desired rich media contained therein. As documents can be quite expansive in size, this is often a time-consuming and insipid task.

One example of an existing document management system is MediaBin from Interwoven. MediaBin is a system capable of, among other things, presenting multiple Microsoft PowerPoint presentations in a window to help users assemble new presentations from existing presentation elements. However, this system suffers from the drawback that users must first identify which documents (e.g., PowerPoint presentations) will contain the desired rich media for reuse. Also, systems such as MediaBin require users to manually parse documents in order to locate the desired rich media content contained therein. Further still, systems such as MediaBin do not classify the rich media content contained within documents into semantically meaningful taxonomies, thereby forcing users to repeat the aforementioned process each time they want to locate a reusable piece of rich media.

Another existing document management system is Documill Visual Search. Documill provides a system for visualizing document content (Microsoft Office and PDF files) in document repositories. Documill operates by comparing the text entered as a search query against the textual content of documents stored within a repository. Only those pages of a document that contain text corresponding to the search query are displayed as results. Each page that is returned following the search is represented as a thumbnail (i.e., a reduced-size depiction of the actual page) on the display screen. Within each thumbnail, the text matching the search terms is highlighted, permitting a user to make a prompt visual relevancy determination.

However, Documill also suffers from a number of drawbacks. First, the determination of which pages to display on the results screen is based on keyword matching. Consequently, non-textual rich media residing within a document is not considered during the search, leading to less relevant search results. Furthermore, systems such as Documill display thumbnails of entire pages of a document, even if only a small portion of the content on a given page is actually relevant to the search. This can result in an information-overload situation in which a user is required parse through each individual page that is displayed to find the desired content. Further still, as with the MediaBin system, Documill does not classify the rich media contained within documents into semantically meaningful taxonomies, thereby forcing users to repeat the aforementioned process each time they want to locate a reusable piece of rich media.

Yet another problem facing existing document management systems is their inability to generate a reusable piece of rich media (e.g., a graphic) from a document by assembling the reusable piece of rich media from its discrete components. For example, a particular graphic in a document may consist of a combination of natural-type graphics (e.g., identified/extracted graphics, graphical construct elements, and/or candidate reusable graphic components) and/or synthetic-type graphics (e.g., identified/extracted graphics, graphical construct elements, and/or candidate reusable graphic components).

A natural-type graphic refers to a graphic that exists as a unified whole without any particular conscious assembly of individual graphic elements. That is to say, the largest subcomponent of a natural-type graphic is a single pixel. For example, a natural-type graphic could be saved .bmp format, .jpg format, .tiff format, .png format, or any other suitable image format where the largest subcomponent of the image is a single pixel. A natural-type graphic might include, for example, a digital photograph of Mt. Everest, a bitmap image created using the freehand drawing tool, or a digital reproduction of a hand-drawn cartoon.

Conversely, a synthetic-type graphic refers to a graphic exhibiting order and/or symmetry that is created entirely by digital means, such as an icon, map, figure, chart, diagram, stencil-shape in Microsoft Visio, etc. That is to say, the largest sub-component of a synthetic-type graphic is more than a single pixel. For instance, a bar-graph located on a slide of a Microsoft PowerPoint presentation is exemplary of a synthetic-type graphic. Similarly, a stencil-shape located on a Microsoft Visio drawing is representative of a synthetic-type graphic. In one example, a synthetic-type graphic may be recognized, and thus extracted, through the use of, for example, Microsoft Office API (application programming interface).

Many reusable graphics are comprised of both natural and synthetic graphics. While existing systems are capable of recognizing either natural or synthetic graphics individually, they are incapable of determining that a given synthetic graphic and a given natural graphic should be combined to generate a single reusable graphic.

It is therefore desirable to provide techniques for searching, retrieving, synthesizing, storing, and classifying graphics contained within documents.

SUMMARY OF THE INVENTION

The instant disclosure describes techniques for processing a reusable graphic in a document. To this end, in one example, an identified graphic is extracted from a document. As used herein, a graphic comprises a digital visual representation. By way of non-limiting example, a graphic could be a photograph, drawing, graph, chart, diagram, geometric design, map, or any other suitable digital visual representation that is not comprised entirely of text. As used herein, extracting a graphic comprises making a copy of a graphic contained within a document and storing the copy in a storage medium. For example, the extracted graphic may be stored in a reusable graphic repository comprising any suitable digital storage medium.

At least one structural feature associated with the extracted graphic is also extracted. In this context, extracting at least one structural feature comprises making a copy of structural features associated with the extracted graphic so that the copied structural features are available for use in classifying the extracted graphic. As used herein, structural features may include the names of graphical construct elements within the extracted graphic, coordinates of those graphical construct elements, and/or the size of a graphic in relation to a structural characteristic of the document. A given graphical construct element could be, for example, a line, a shape (e.g., triangle, rectangle, square, hexagon, etc.), or any other suitable grouping of pixels that make up, in whole or in part, a graphic. In one example, the names of the graphical construct elements may be recognized by an application programming interface such as Object Model Reference for Microsoft Office Systems. The structural characteristics of a document may be, for example, the spatial dimensions of each section (e.g., each page, each slide, etc.) of the document containing the graphic.

The extracted graphic is classified based on at least the extracted structural feature, but may be classified based on other features as well. For example, visual features may also be extracted from an extracted graphic and used to classify the extracted graphic. Additionally, textual features may be extracted from an extracted graphic, or a document containing an extracted graphic, and used to classify the extracted graphic. In this context, textual features include, for example, text residing within the document containing the extracted graphic, text residing within the extracted graphic itself, text residing in metadata associated with the extracted graphic, or text residing in metadata associated with the document. Visual features may include a variety of descriptors and/or features as known in the art.

In one example, at least one extracted textual feature is selected for use in classifying the extracted graphic. In this example, either an odds-ratio method or an information-gain method may be employed to select the at least one extracted textual feature as known in the art. However, feature selection is not limited to the above methods and could alternatively employ, for example, $-\chi^2$ test (CHI), mutual information, frequency-based feature selection, or any other suitable feature selection method known in the art. In another example, a supervised or semi-supervised classification algorithm is used to classify the extracted graphic as known in the art.

In an embodiment, the extracted graphic is classified based on a pre-defined taxonomy structure. In one embodiment, the pre-defined taxonomy structure may be specialized for enterprise needs. For example, extracted non-textual content could be classified into semantically meaningful categories describing the graphic's type or typical use. By way of non-limiting example, the predefined taxonomy structure could include categories such as photograph, table, fact box, focus box, process flow, methodology, approach, logo, architecture diagram, solution overview, plan, teaming partners, work team, logos and credentials, graph, and/or organizational chart. In one example, the document is scanned to identify a graphic contained therein so as to provide an identified graphic. In one embodiment, the techniques described herein are implemented using stored instructions executed by one or more processors.

The instant disclosure also describes techniques for generating a reusable graphic from a document. To this end, candidate reusable graphic components that are contained within a document are identified. In this context, a candidate reusable graphic component consists of any suitable grouping of pixels that make up, in whole or in part, a reusable graphic. Candidate reusable graphic components may be of the natural type (i.e., the largest sub-component of the candidate reusable graphic component is a single pixel) or synthetic type (i.e., the largest sub-component of the candidate reusable graphic component is more than a single pixel). In one example, identifying candidate reusable graphic components includes analyzing the identified candidate reusable graphic component to determine if an additional candidate reusable graphic component is within the identified candidate reusable graphic component. In this example, when an additional candidate reusable graphic component is determined to be within the identified candidate reusable graphic component, each additional candidate reusable graphic component is treated as an identified candidate reusable graphic component. Recursively proceeding in this manner permits for the identification of candidate reusable graphic components that might be contained within the border (i.e., the pixels constituting the outer edges of a candidate reusable graphic component) of another candidate reusable graphic component.

Feature information is also extracted about each identified candidate reusable graphic component. The extracted feature information may be, for example, candidate reusable graphic component type information, textual information, structural information, and/or visual information. The candidate reusable graphic type information classifies a given candidate reusable graphic component as being either synthetic-type or natural-type.

The textual information may include, for example, text residing within a synthetic-type candidate reusable graphic component, the text residing within a natural-type candidate reusable graphic component, and/or text format information. In one example, optical character recognition is used to extract text residing within each natural-type candidate reusable graphic component. The text format information may include a font name associated with the extracted text (e.g., "times new roman," "bookman old style," etc.), a font size associated with the extracted text (e.g., "8 pt. font," "10 pt. font," etc.), and/or a text modification indicia. A text modification indicia indicates further stylistic aspects of the text, such as whether the extracted text is, for example, underlined, double underlined, italicized, bolded, stricken-through, all caps, small caps, etc.

In one example, the structural information includes the names of identified candidate reusable graphic components. An identified candidate reusable graphic component could have a name indicating, for example, that it is a line, a shape (e.g., triangle, rectangle, square, hexagon, arrow, etc.), a symbol, etc. In one example, the names of the identified candidate reusable graphic components could be extracted by an application programming interface such as Object Model Reference for Microsoft Office Systems.

Structural information might also include the coordinates of a synthetic-type identified candidate reusable graphic component or the size of a natural-type identified candidate reusable graphic component. The coordinates represent the synthetic-type identified candidate reusable graphic component's location within the document. The size of a natural-type identified candidate reusable graphic component represents the natural-type identified candidate reusable graphic component's size in relation to a structural characteristic of the document that the natural-type identified candidate reusable graphic component is contained in. The structural characteristics of the document may include, for example, the spatial dimensions of each section of the document containing an identified candidate reusable graphic component.

In one example, the visual information may include a variety of descriptors and/or features as known in the art.

In another example, the extracted environment information may include text residing outside of the identified candidate reusable graphic component but within in the document itself, text residing in metadata associated with the identified candidate reusable graphic component, text residing in metadata associated with the document containing the identified candidate reusable graphic component, and/or structural characteristics of the document.

Finally, in one example, synthesizing a reusable graphic from at least one identified candidate reusable graphic component includes evaluating the extracted feature information and the extracted environment information associated with each identified candidate reusable graphic component to determine if individual candidate reusable graphic components should be consolidated into a single reusable graphic.

According to one aspect of the present invention, there is provided a computer-implemented method for processing a reusable graphic in a document, the method comprising extracting an identified graphic from the document to provide an extracted graphic; storing the extracted graphic in a reusable graphic repository; extracting at least one structural feature associated with the extracted graphic; and classifying the extracted graphic based on the at least one structural feature.

According to one embodiment, the method further comprises extracting at least one textual feature from the document or the extracted graphic, extracting at least one visual feature from the extracted graphic, and classifying the extracted graphic based on the at least one extracted textual or visual feature.

According to another embodiment, extracting the at least one textual feature includes extracting at least one of: text residing within the document containing the extracted graphic; text residing within the extracted graphic itself; text residing in metadata associated with the extracted graphic; and text residing in metadata associated with the document.

According to another embodiment, extracting the at least one structural feature includes extracting at least one of: a name of at least one graphical construct element within the extracted graphic; coordinates of the at least one graphical construct element; and size of the extracted graphic in relation to a structural characteristic of the document.

According to another embodiment, classifying the extracted graphic further comprises classifying the extracted graphic using a supervised or semi-supervised classification algorithm.

According to another embodiment, classifying the extracted graphic further comprises classifying the extracted graphic based on a pre-defined taxonomy structure.

According to another embodiment, the method further comprises: scanning the document to identify a graphic therein to provide the identified graphic.

According to a further aspect of the present invention, there is provided an apparatus for processing a reusable graphic in a document, the apparatus comprising: a graphic extraction module operative to extract an identified graphic from the document to provide an extracted graphic; a reusable graphic repository, operatively connected to the graphic extraction module, operative to store the extracted graphic; a feature extraction module, operatively connected to the reusable graphic repository, operative to extract at least one structural feature associated with the extracted graphic; and a classification module, operatively connected to the feature extraction module and the reusable graphic repository, operative to classify the extracted graphic based on the at least one structural feature.

According to one embodiment, the feature extraction module is further operative to extract at least one textual feature from the document or the extracted graphic and extract at least one visual feature from the extracted graphic, and the classification module is further operative to classify the extracted graphic based on the at least one extracted textual or visual feature.

According to another embodiment, the feature extraction module is further operative to extract at least one of the following textual features: text residing within the document containing the extracted graphic; text residing within the extracted graphic itself; text residing in metadata associated with the extracted graphic; and text residing in metadata associated with the document.

According to another embodiment, the feature extraction module is further operative to extract at least one of the following structural features: a name of at least one graphical construct element within the extracted graphic; coordinates of the at least one graphical construct element; and size of the extracted graphic in relation to a structural characteristic of the document.

According to another embodiment, the classification module is further operative to classify the extracted graphic using a supervised or semi-supervised classification algorithm.

According to another embodiment, the classification module is further operative to classify the extracted graphic based on a pre-defined taxonomy structure.

According to another embodiment, the apparatus further comprises: a graphic identification module operative to scan the document to identify a graphic therein to provide the identified graphic.

According to a further aspect of the present invention, there is provided a computer implemented method for generating a reusable graphic from a document, comprising: identifying candidate reusable graphic components contained within the document to provide identified candidate reusable graphic components; extracting feature information about each identified candidate reusable graphic component to provide extracted feature information; extracting environment information about each identified candidate reusable graphic component's environment to provide extracted environment information; and synthesizing a reusable graphic from at least one identified candidate reusable graphic component based on the extracted feature information and the extracted environment information.

According to one embodiment, identifying candidate reusable graphic components contained within the document comprises, for each identified candidate reusable graphic component: analyzing the identified candidate reusable graphic component to determine if at least one additional candidate reusable graphic component is within the identified candidate reusable graphic component; and when at least one additional candidate reusable graphic component is determined to be within the identified candidate reusable graphic component, treating each at least one additional candidate reusable graphic component as an identified candidate reusable graphic component.

According to another embodiment, the extracted feature information comprises at least one of: candidate reusable graphic component type information, wherein a particular identified candidate reusable graphic component may be of a synthetic type or a natural type; textual information; structural information; and visual information.

According to another embodiment, the textual information comprises at least one of: text residing within a synthetic-type identified candidate reusable graphic component; text residing within a natural-type identified candidate reusable graphic component; and text format information.

According to another embodiment, the text format information comprises at least one of: a font name associated with the extracted text; a font size associated with the extracted text; and a text modification indicia.

According to another embodiment, optical character recognition is used to extract text residing within each natural-type identified candidate reusable graphic component.

According to another embodiment, the structural information comprises at least one of: a name of an identified candidate reusable graphic component; coordinates of a synthetic-type identified candidate reusable graphic component, representing the synthetic-type identified candidate reusable graphic component's location within the document; and size of a natural-type identified candidate reusable graphic component, representing the natural-type identified candidate reusable graphic component's size in relation to a structural characteristic of the document that the natural-type identified candidate reusable graphic component is contained in.

According to another embodiment, the extracted environment information comprises at least one of: text residing outside of the identified candidate reusable graphic component but within in the document itself; text residing in metadata associated with the identified candidate reusable graphic component; text residing in metadata associated with the document containing the identified candidate reusable graphic component; and structural characteristics of the document.

According to another embodiment, the structural characteristics of the document comprise spatial dimensions of each section of the document containing at least one identified candidate reusable graphic component.

According to another embodiment, synthesizing a reusable graphic from at least one identified candidate reusable graphic component based on the extracted feature information and the extracted environment information comprises: evaluating the extracted feature information and the extracted environment information associated with each identified candidate reusable graphic component to determine if individual candidate reusable graphic components should be consolidated into a single reusable graphic.

According to a further aspect of the present invention, there is provided an apparatus for generating a reusable graphic from a document, comprising: a candidate reusable graphic identification module operative to identify candidate reusable graphic components contained within the document; a feature information extracting module, operatively connected to the candidate reusable graphic identification module, operative to extract feature information about each identified candidate reusable graphic component; an environment information extracting module, operatively connected to the candidate reusable graphic identification module, operative to extract environment information about each identified candidate reusable graphic component; and a reusable graphic synthesizing module, operatively connected to the feature information extracting module and the environment information extracting module, operative to synthesize a reusable graphic from at least one identified candidate reusable graphic component based on the extracted feature information and the extracted environment information.

According to another embodiment, the candidate reusable graphic identification module is further operative to, for each identified candidate reusable graphic component: analyze the identified candidate reusable graphic component to determine if at least one additional candidate reusable graphic component is within the identified candidate reusable graphic component; and when at least one additional candidate reusable graphic component is determined to be within the identified candidate reusable graphic component, treat each at least one additional candidate reusable graphic component as an identified candidate reusable graphic component.

According to another embodiment, the feature information extracting module is further operative to extract at least one of the following types of feature information: candidate reusable graphic component type information, wherein a particular identified candidate reusable graphic component may be of a synthetic type or a natural type; textual information; structural information; and visual information.

According to another embodiment, textual information comprises at least one of: text residing within a synthetic-type identified candidate reusable graphic component; text residing within a natural-type identified candidate reusable graphic component; and text format information.

According to another embodiment, the text format information comprises at least one of: a font name associated with the extracted text; a font size associated with the extracted text; and a text modification indicia.

According to another embodiment, optical character recognition is used to extract text residing within each natural-type identified candidate reusable graphic component.

According to another embodiment, the structural information comprises at least one of: a name of an identified candidate reusable graphic component; coordinates of a synthetic-type identified candidate reusable graphic component, representing the synthetic-type identified candidate reusable graphic component's location within the document; and size of a natural-type identified candidate reusable graphic component, representing the natural-type identified candidate reusable graphic component's size in relation to a structural characteristic of the document that the natural-type identified candidate reusable graphic component is contained in.

According to another embodiment, the extracted environment information comprises at least one of: text residing outside of the identified candidate reusable graphic component but within in the document itself; text residing in metadata associated with the identified candidate reusable graphic component; text residing in metadata associated with the document containing the identified candidate reusable graphic component; and structural characteristics of the document.

According to another embodiment, the structural characteristics of the document comprise spatial dimensions of each section of the document containing at least one identified candidate reusable graphic component.

According to another embodiment, the reusable graphic synthesizing module is further operative to: evaluate the extracted feature information and the extracted environment information associated with each identified candidate reusable graphic component to determine if individual candidate reusable graphic components should be consolidated into a single reusable graphic.

BRIEF DESCRIPTION OF THE DRAWINGS

The features described in this disclosure are set forth with particularity in the appended claims. These features and attendant advantages will become apparent from consideration of the following detailed description, taken in conjunction with the accompanying drawings. One or more embodiments are now described, by way of example only, with reference to the accompanying drawings wherein like reference numerals represent like elements and in which:

DETAILED DESCRIPTION OF THE PRESENT EMBODIMENTS

Figure 1:
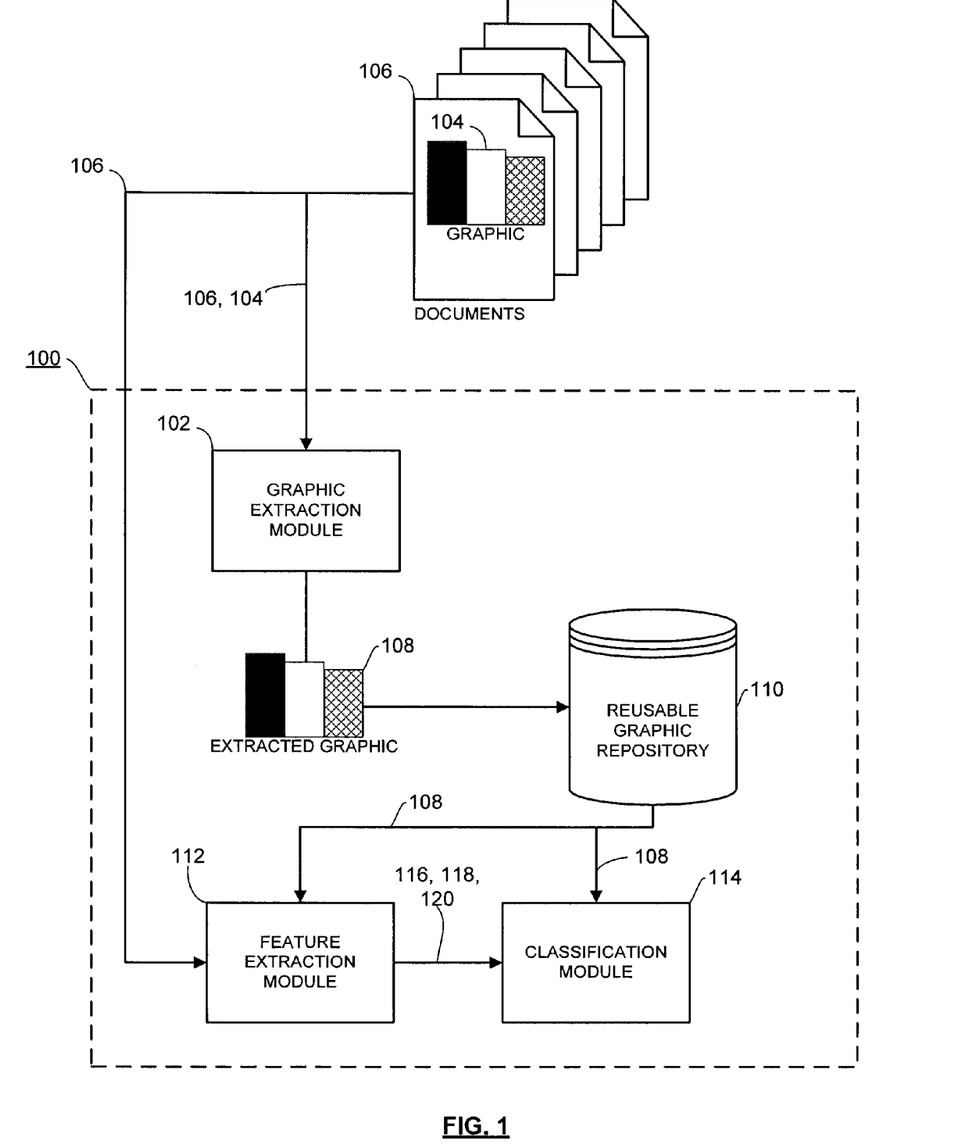
FIG. 1 is a block diagram of an apparatus for processing a reusable graphic in a document in accordance with one embodiment of the disclosure.

Referring now to FIG. 1, an apparatus 100 for processing a reusable graphic in a document 106 is illustrated in accordance with one embodiment of the present disclosure. In the illustrated embodiment, the apparatus 100 comprises a graphic extraction module 102, a reusable graphic repository 110, a feature extraction module 112, and a classification module 114. As used herein, the term "module" can include an electronic circuit, one or more processors (e.g., shared, dedicated, or group of processors such as but not limited to microprocessors, digital signal processors, or central processing units) and memory that execute one or more software or firmware programs, combinational logic circuits, an application specific integrated circuit, and/or other suitable components that provide the described functionality. Further still, the apparatus 100 may be implemented by networked computing devices, such as server computers or the like, wherein each computing device implements one or more of the illustrated modules 102-114.

The graphic extraction module 102 accepts a document 106 containing an identified graphic 104 as input. The document 106 containing the identified graphic 104 may be, for example, a Microsoft Office document such as a PowerPoint document, a Word document, or any other digital document containing graphics suitable for reuse. An identified graphic 104 could be, for example, a photograph, drawing, graph, chart, diagram, geometric design, map, or any other suitable digital visual representation that is not comprised entirely of text. The graphic extraction module 102, using techniques well-known in the art, is operative to extract an identified graphic 104 from the document 106 so as to provide an extracted graphic 108 to the reusable graphic repository 110.

The reusable graphic repository 110 is operatively connected to the graphic extraction module 102 and is operative to store extracted graphics, such as extracted graphic 108 for reuse. By way of non-limiting example, the reusable graphic repository 110 could be SRAM, DRAM, ROM, flash memory, magnetic computer storage devices, optical disks, or any other suitable digital storage medium. Alternatively, the repository 110 can be implemented by a suitable database server deploying a database management system.

The feature extraction module 112 is operatively connected to the reusable graphic repository 110 and is operative to extract at least one structural feature 116 associated with an extracted graphic 108 being stored in the reusable graphic repository 110. The feature extraction module 112 is also configured to receive the document 106, allowing the feature extraction module 112 to extract at least one textual feature 118 from the document 106 or the extracted graphic 108. The feature extraction module 112 may additionally or alternatively extract at least one visual feature 120 from the extracted graphic 108 as well. An in-depth discussion on the types of structural, textual, and visual features 116, 118, 120 that the feature extraction module 112 is capable of extracting is provided below with respect to the discussion of FIG. 4.

The classification module 114 is operatively connected to the feature extraction module 112 and the reusable graphic repository 110 and is operative to classify an extracted graphic 108 based on at least one structural feature 116 associated with the extracted graphic 108. However, the classification module 114 may classify an extracted graphic based on at least one textual 118 and/or visual 120 feature associated with an extracted graphic 108 as well. In this manner, the classification module 114 may consider structural features 116, textual features 118, and/or visual features 120 associated with an extracted graphic 108 in determining how to classify the extracted graphic 108. The classification module 114 is further operative to classify the extracted graphic 108 using a supervised or semi-supervised classification algorithm. The supervised classification algorithm may comprise, for example, support vector machines, Naïve Bayes, decision trees, or any other suitable supervised classification algorithm known in the art. The semi-supervised classification algorithm may comprise, for example, expectation maximization, self-training, co-training, transductive support vector machines, or any other suitable semi-supervised classification algorithm known in the art. The classification module 114 may also classify an extracted graphic 108 based on a pre-defined taxonomy structure. For example, the extracted graphic 108 could be classified into one or more semantically meaningful categories such as photograph, table, fact box, focus box, process flow, methodology, approach, logo, architecture diagram, solution overview, plan, teaming partners, work team, credentials, graph, and/or organizational chart. However, it is contemplated that other semantically meaningful categories may be equally employed as desired.

In one example, an extracted graphic 108 may be classified in the following manner. After the reusable graphic repository 110 is populated with extracted graphics 108, a sample set of extracted graphics 108 is selected from the reusable graphic repository 110 for labeling. Domain experts then label each extracted graphic 108 from the sample set as belonging to a semantically meaningful category in a given predefined taxonomy structure. For example, a particular extracted graphic may be labeled as belonging to the "photograph" category of a predefined taxonomy structure. The labeled sample set of extracted graphics are then divided into a training set and a testing set and a supervised classification algorithm such as C4.5 decision trees, Naïve Bayes, Linear Support Vector Machines (SVM), SVMs with polynomial kernel, or Radial Bases Function (RBF) kernel is applied. Different combinations of structural, textual and/or visual features 116, 118, 120 are used as representations of the training sets along with the domain expert provided labels to obtain data models. The obtained data models are applied to the testing sets of extracted graphics (which are now represented by structural, textual and/or visual features 116, 118, 120) to generate predicted labels for each of the extracted graphics (i.e., which semantically meaning category a particular extracted graphic should belong to). The predicted labels may then be compared to the domain expert labels to estimate the performance of the classifier that was used to generate the predicted label. For example, if the classifier labeled a given extracted graphic 108 as belonging to the photograph category, and the domain expert labeled the same extracted graphic 108 as belonging to the photograph category, then that classifier could be generally be regarded as demonstrating good performance. The performance of a classifier can be quantitatively measured in terms of precision, recall, and F1 scores, for example. The aforementioned process may be repeated several times (e.g., ten times) to determine an average performance of a given classifier. In this manner, it is possible to test the performance of different classifiers to identify a classifier that will provide the best performance for a given application.

Moreover, it is possible to evaluate the contribution of each feature to the performance (i.e., accuracy) of a given classifier and further investigate the usage of unlabeled data in order to improve the performance of a given classifier through semi-supervised classification approaches. For example, co-training can be used with different feature sets (e.g., textual and structural) as different data views. Different data views of the labeled training data may be used to build separate classifiers and the most confident prediction of each classifier on the unlabeled data is used to incorporate both labeled and unlabeled data in order to build the data model of the other classifier. What results is a data model for the classifier learned over a training set comprised of both labeled and unlabeled data. With respect to both supervised or semi-supervised learning, the learned classifier data models are applied on the entire reusable graphics repository 110 and the extracted graphics 108 are classified into one of the predefined taxonomy categories.

Figure 2:
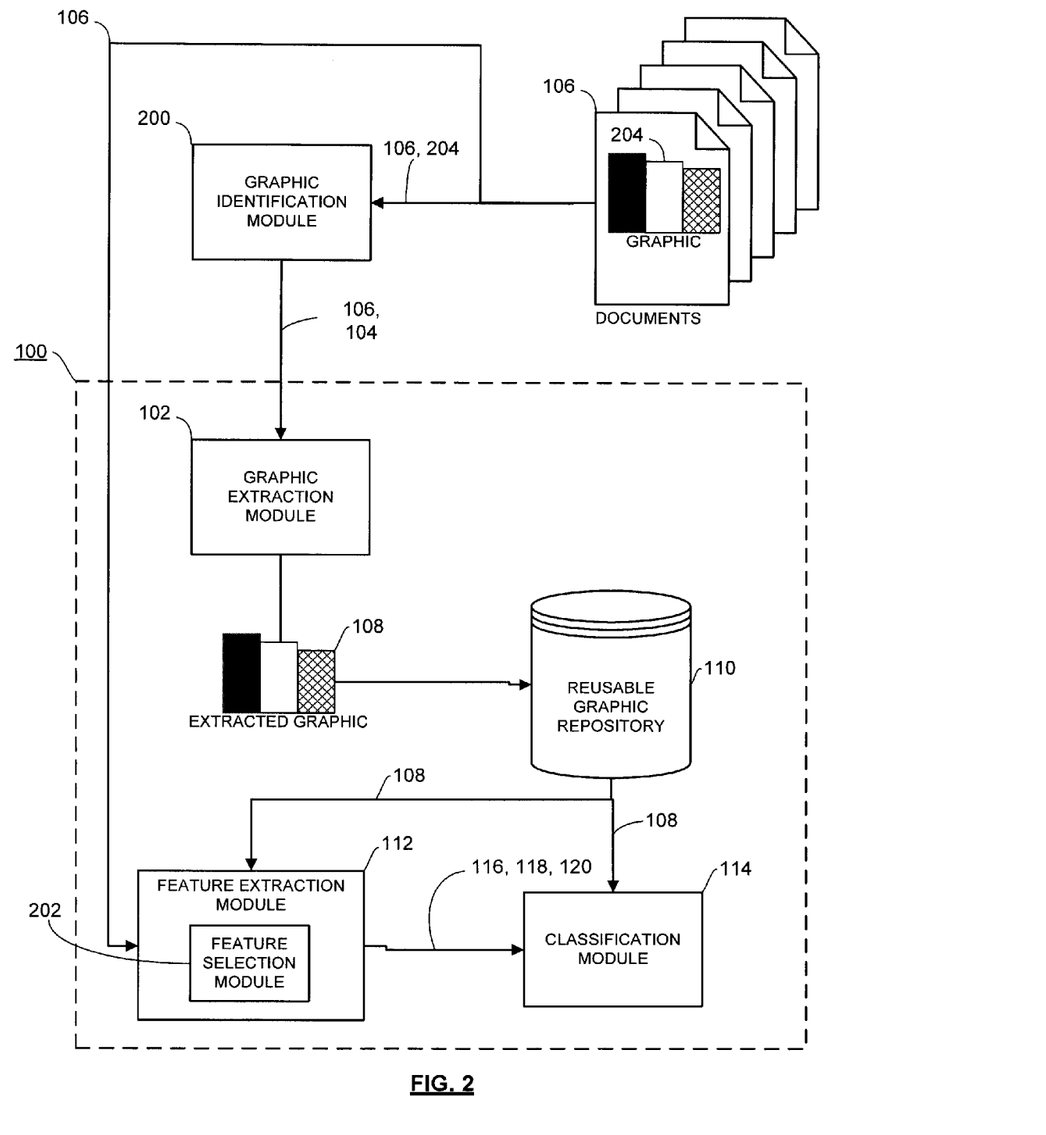
FIG. 2 is a block diagram of an apparatus for processing a reusable graphic in a document in accordance with another embodiment of the disclosure.

Referring now to FIG. 2, an apparatus 100 for processing a reusable graphic in a document 106 in accordance with another embodiment of the present disclosure is illustrated. This embodiment includes a graphic identification module 200. The graphic identification module 200 accepts a document 106 containing an unidentified graphic 204 as input. The graphic identification module 200 is operative to scan the document 106 to identify a graphic contained therein to provide an identified graphic 104. For example, within a given document 106, the graphic identification module 200 is operative to identify text, synthetic-type graphics, and natural-type graphics. The graphic identification module 200 may identify synthetic-type graphics using techniques well-known in the art, such as, for example, through the use of an API such as Object Model Reference for Microsoft Office Systems. Similarly, the graphic identification module 200 may identify natural-type graphics using techniques well-known in the art. For example, in one technique, an API will identify all of the synthetic-type graphics in a particular document 106. Then, the portions of the document 106 that are not identified as synthetic-type graphics are treated as identified natural-type graphics. In one example, natural-type graphics and/or synthetic-type graphics must be of a certain size in relation to a structural characteristic of the document 106 in order to qualify as an identified graphic 104. For example, in one embodiment, if a particular natural-type or synthetic-type graphic occupies less than 5% of the physical dimensions of a section (e.g., a slide, a page, etc.) of the document 106, it is not treated as an identified graphic 104. In an example where the document 106 is a scanned digital version of a paper document (e.g., a .pdf file), the graphic identification module 200 is operative to segment pages/sections of the document 106 and differentiate text from graphics, using techniques well-known in the art, so as to provide at least one identified graphic 104.

The graphic extraction module 102, which is operatively connected to the graphic identification module 200, then extracts the identified graphic 104 from the document 106 to provide an extracted graphic 108. Although illustrated as separate from the apparatus 100, the graphic identification module 200 may be implemented by the apparatus 100 as well.

As further illustrated by FIG. 2, in this embodiment, the feature extraction module 112 further comprises a feature selection module 202 operative to select an extracted textual feature 118 for use in classifying the extracted graphic 108 (e.g., by the classification module 114). That is, the feature selection module 202 selects one of a plurality of textual features as being representative of the extracted graphic 108. For example, the feature selection module 202 may use an odds-ratio method, information gain method, $-\chi^2$ test (CHI) method, mutual information method, frequency-based feature selection method, or any other suitable feature selection method known in the art capable of selecting at least one extracted textual feature 118 to use in classifying the extracted graphic 108. By using such feature selection techniques, the size of the textual feature set can be reduced. This has the effect of freeing up computing resources and simultaneously removing noise (i.e., textual features that might not be useful in classifying the extracted graphic 108), so as to improve the classification accuracy of the classification module 114.

Figure 3:
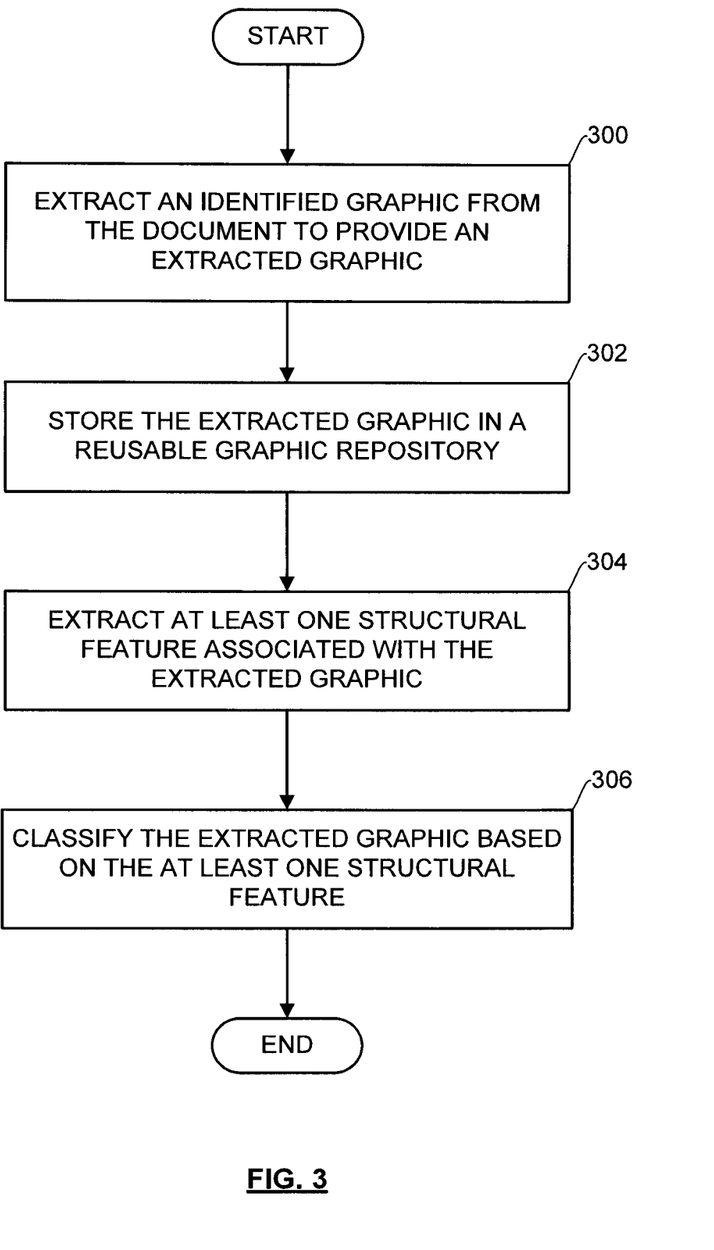
FIG. 3 is a flowchart illustrating a method for processing a reusable graphic in a document in accordance with one embodiment of the disclosure.

Referring now to FIG. 3, a flow chart illustrating a computer-implemented method for processing a reusable graphic in a document is provided in accordance with one embodiment of the present disclosure. For example, the processing illustrated in FIG. 3 may be carried out by the apparatus 100 illustrated in either FIG. 1 or FIG. 2. At step 300, an identified graphic 104 is extracted from a document 106 to provide an extracted graphic 108. As noted above, extracting a graphic comprises making a copy of the graphic contained within the document 106 and transferring the copy for storage in a storage medium. At step 302, the extracted graphic 108 is stored in a reusable graphic repository 110. At step 304, at least one structural feature 116 associated with the extracted graphic 108 is extracted. As noted above, extracting a structural feature 116 of an extracted graphic 108 comprises making a copy of the of the structural feature 116 so that it is available for use in classifying the extracted graphic 108. Structural features 116 may include, for example, the names of graphical construct elements within the extracted graphic 108, coordinates of those graphical construct elements, and/or the size of a graphic in relation to a structural characteristic of the document 106. A given graphical construct element could be, for example, a line, a shape (e.g., triangle, rectangle, square, hexagon, arrow, etc.), or any other suitable grouping of pixels that make up, in whole or in part, an extracted graphic 108. The names of the graphical construct elements may be recognized by an application programming interface, such as Object Model Reference for Microsoft Office Systems. The structural characteristics of a document 106 may be, for example, the spatial dimensions of each section (e.g., each page, each slide, etc.) of the document 106 containing the graphic.

At step 306, the extracted graphic 108 is classified based on the at least one structural feature 116. However, as discussed in greater detail below with reference to FIG. 4, other features (e.g., textual features 118 and/or visual features 120) may also be considered in classifying the extracted graphic 108. This is based on an understanding that different features (e.g., textual, visual, and structural) affect the accuracy of the classification of a given extracted graphic in different ways. For example, experimental data reveals that the use of structural features 116 in classifying an extracted graphic 108 assures a high recall value. A recall value measures the capability of, for example, the classification module 114, to classify extracted graphics into, for example, the correct category in a pre-defined taxonomy. In contrast, experimental data reveals that the use of visual features 120 in classifying an extracted graphic 108 assures a high precision value. A precision value defines the capability of, for example, the classification module 114 to assure that any extracted graphics classified into a category actually belong to that category. Finally, experimental data reveals that using some combination of textual, visual, and structural features in classifying an extracted graphic 108 will yield the most accurate classification results. In this manner, the present disclosure envisions weighting different features differently when classifying a given extracted graphic in order to provide for optimal classification accuracy.

Figure 4:
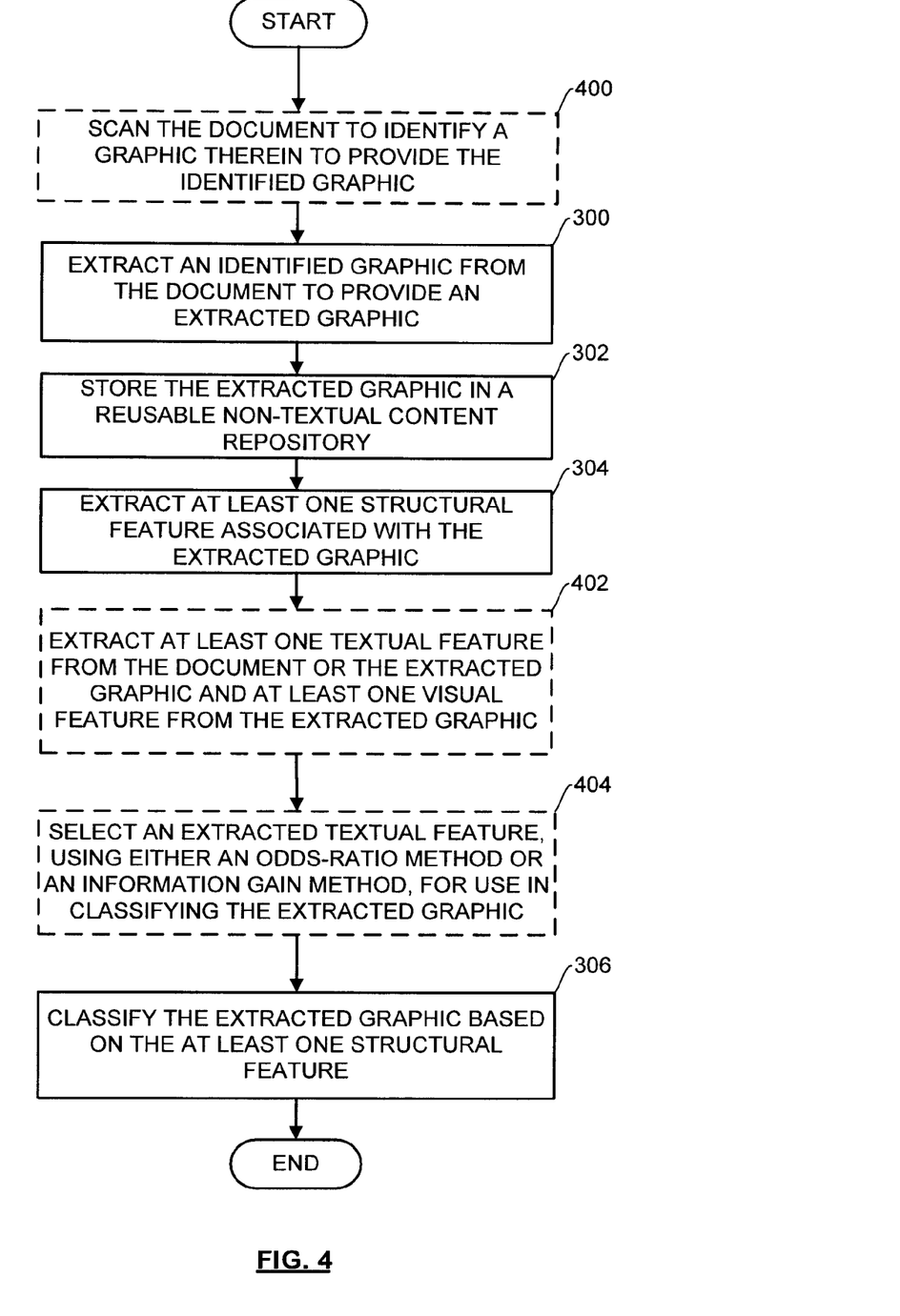
FIG. 4 is a flowchart illustrating a method for processing a reusable graphic in a document in accordance with another embodiment of the disclosure.

Referring now to FIG. 4, a flow chart illustrating a computer-implemented method for processing a reusable graphic in a document is provided in accordance with another embodiment of the present disclosure. For example, the processing illustrated in FIG. 4 may be carried out by the apparatus 100 illustrated in either FIG. 1 or FIG. 2. This embodiment includes a number of optional steps that may provide for a more accurate classification of the extracted graphic 108 as compared to the embodiment depicted in FIG. 3. At step 400, the document 106 is scanned to identify a graphic therein so as to provide an identified graphic. At step 402, at least one textual feature 118 from the document 106 or the extracted graphic 108 is extracted. Additionally, or alternatively, at step 402, at least one visual feature 120 is extracted from the extracted graphic 108. Textual features 118 may include, for example, text residing within the document containing the extracted graphic, text residing within the extracted graphic itself, text residing in metadata associated with the extracted graphic, or text residing in metadata associated with the document 106. Visual features 120 may include, for example, a color layout descriptor, a color structure descriptor, an edge histogram descriptor, a homogeneous texture descriptor, a dominant color descriptor, a scalable color descriptor, a texture browsing descriptor, a Gabor feature descriptor, a grey-level co-occurrence matrix descriptor, a region shape descriptor, a contour shape descriptor, a shape 3D descriptor, a SIFT descriptor (scale-invariant feature transform descriptor), a SURF descriptor (speeded up robust features descriptor), or any other suitable visual features 120 known in the art. At step 404, an extracted textual feature 118 is selected, using either an odds-ratio or information gain method (as discussed above), for use in classifying the extracted graphic 108. At step 306, the extracted graphic 108 is classified based on the at least one structural feature 116 extracted at step 304. However, in this embodiment, it is contemplated that either a textual feature 118, a visual feature 120, or both a textual and a visual feature 118, 120 will also be used in classifying the extracted graphic 108. Classifying an extracted graphic 106 using some combination of structural, textual, and visual features 116, 118, 120 is believed to yield more accurate classifications than merely classifying an extracted graphic 108 using only one of the features.

The embodiments described above relative to FIGS. 1-4 concern processing of graphics in documents to identify and classify reusable graphics. As noted above, there are occasions in which multiple graphics are included in close proximity to one another such that the real value in identifying the reusable graphics lies in recognizing the unified nature of multiple graphics. For example, in a PowerPoint Presentation, multiple shapes in a slide may be related to each other in order to form a larger, more meaningful graphic. In this case, it is important to not only recognize the multiple shapes, but to also generate the larger graphic as the reusable graphic.

Figure 5:
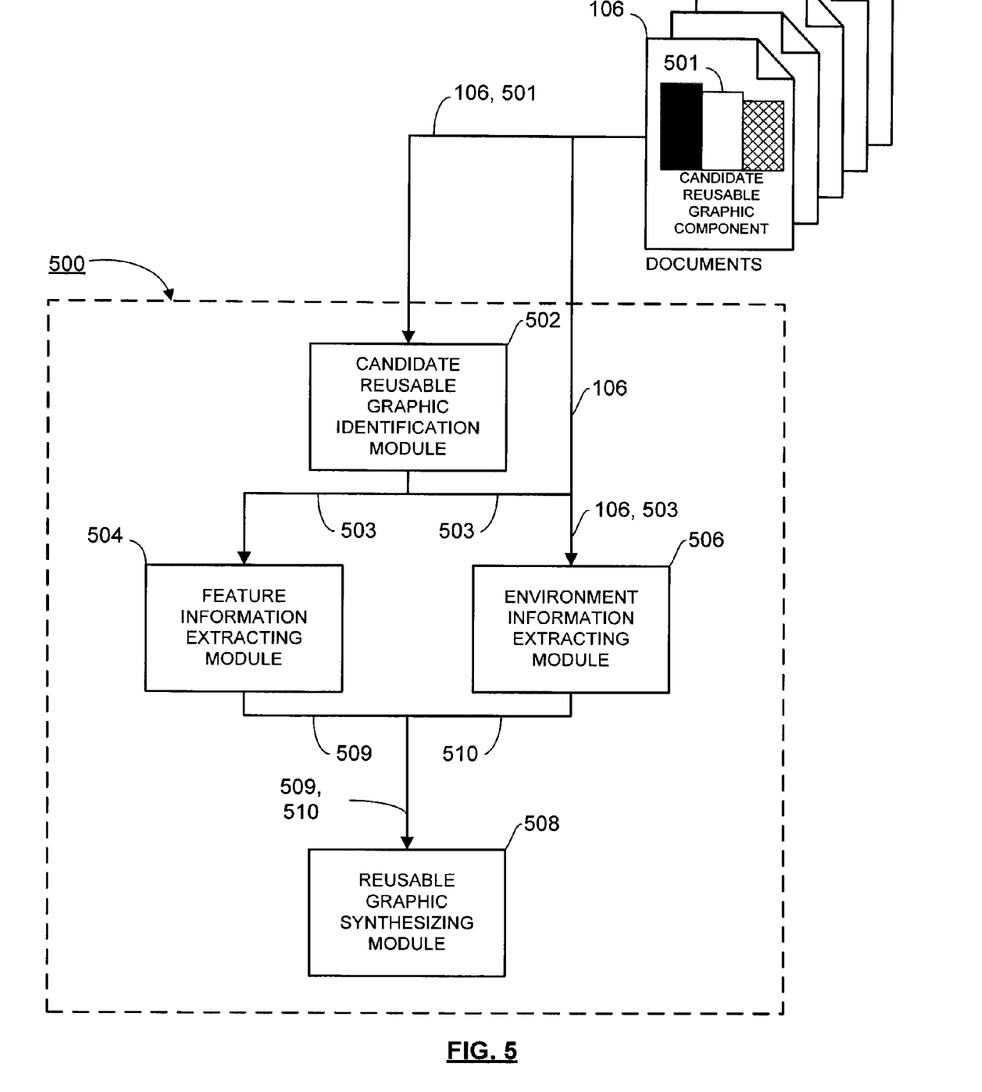
FIG. 5 is a block diagram of an apparatus for generating a reusable graphic from a document in accordance with one embodiment of the disclosure.

Referring now to FIG. 5, an apparatus 500 for generating a reusable graphic from a document is illustrated in accordance with one embodiment of the present disclosure. In one example, apparatus 500 may be a component of graphic identification module 200. In the illustrated embodiment, the apparatus 500 comprises a candidate reusable graphic identification module 502, a feature information extracting module 504, an environment information extracting module 506, and a reusable graphic synthesizing module 508. The candidate reusable graphic identification module 502 accepts a document 106 containing a candidate reusable graphic component 501 as input and outputs an identified candidate reusable graphic component 503. As used herein, the term "module" can include an electronic circuit, one or more processors (e.g., shared, dedicated, or group of processors such as but not limited to microprocessors, digital signal processors, or central processing units) and memory that execute one or more software or firmware programs, combinational logic circuits, an application specific integrated circuit, and/or other suitable components that provide the described functionality. Further still, the apparatus 500 may be implemented by networked computing devices, such as server computers or the like, wherein each computing device implements one or more of the illustrated modules 502-508.

As used herein, an identified candidate reusable graphic component 503 may include any suitable grouping of pixels that make up, in whole or in part, a reusable graphic. For example, an identified candidate reusable graphic component 503 could comprise a single point (e.g., one pixel) or line segment making up part of a reusable graphic. In some cases, an identified candidate reusable graphic component 503 could comprise a single point or line segment making up the entire reusable graphic. An identified candidate reusable graphic component 503 could also be more complex than a single point or line segment, such as a shape comprised of several points and line segments (e.g., a polygon) making up the entirety, or part, of a reusable graphic. An identified candidate reusable graphic component 503 may also be treated as either synthetic-type or natural-type as those terms are used herein. For example, a bar graph created in Microsoft PowerPoint and contained within one section (i.e., slide) of the PowerPoint Presentation (i.e., document) could constitute a synthetic-type identified candidate reusable graphic component. Moreover, an individual synthetic-type identified candidate reusable graphic component could alternatively be a single bar of the bar chart, where a combination of all of the bars (i.e., identified candidate reusable graphic components) comprise the reusable graphic. An example of a natural-type identified candidate reusable graphic component would be a digital photograph contained within a slide of a PowerPoint presentation (or any other suitable digital document not comprised entirely of text).

In one embodiment, the candidate reusable graphic identification module 502 is further operative to analyze the identified candidate reusable graphic component 503 to determine if an additional candidate reusable graphic component 501 is within a previously identified candidate reusable graphic component 503. In this embodiment, when an additional candidate reusable graphic component 501 is determined to be within a previously identified candidate reusable graphic component 503, each additional candidate reusable graphic component 501 is itself treated as an identified candidate reusable graphic component 503. Proceeding in this manner permits for the identification of candidate reusable graphic components that might be contained within the border (i.e., the pixels constituting the outer edges of a candidate reusable graphic component) of another candidate reusable graphic component. This process of recursively identifying candidate reusable graphics components may be repeated as necessary to ensure that all candidate reusable graphic components are identified.

For example, the candidate reusable graphic module 502 might identify a candidate reusable graphic component (e.g., a square) contained within a document 106. In line with this embodiment, the candidate reusable graphic module 502 would further analyze the identified candidate reusable graphic component (i.e., the square) to determine if an additional candidate reusable graphic component (e.g., a circle) is contained within the previously identified candidate reusable graphic component (i.e., the square). When an additional candidate reusable graphic component (e.g., a circle) is determined to be contained within a previously identified candidate reusable graphic component (e.g., a square), the candidate reusable graphic module 502 is operative to classify the additional candidate reusable graphic component (i.e., the circle) as an identified candidate reusable graphic component. In this manner, operations such as feature extraction and environment extraction (discussed below) may be performed on the additional candidate reusable graphic component (e.g., the circle in the above-example) as well.

The feature information extracting module 504 illustrated in FIG. 5 is operatively connected to the candidate reusable graphic identification module 502 and the reusable graphic synthesizing module 508. The feature information extracting module 504 is operative to extract feature information 509 about each identified candidate reusable graphic component 503. Feature information 509 describes characteristics of an identified candidate reusable graphic component 503 and may comprise, for example, candidate reusable graphic component type information, textual information, structural information, and/or visual information.

The candidate reusable graphic component type information indicates whether a particular identified candidate reusable graphic component 503 is synthetic-type or natural-type, in accordance with the definitions of "synthetic-type" and "natural-type" discussed above.

Textual information may comprise, for example, text residing within a synthetic-type identified candidate reusable graphic component, text residing within a natural-type identified candidate reusable graphic component, and/or text format information. As used herein, text is said to "reside within" a given identified candidate reusable graphic component 503 when any pixel making up the text intercepts, or is contained wholly within, the boundary of an identified candidate reusable graphic component 503 (i.e., the pixels constituting the outer edge(s) of an identified candidate reusable graphic component 503). In one embodiment, optical character recognition ("OCR") is used to extract the text residing within a natural-type identified candidate reusable graphic component. Text format information may comprise, for example, a font name associated with the extracted text (e.g., "times new roman," "bookman old style," etc.), a font size associated with the extracted text (e.g., "8 pt. font," "10 pt. font," etc.), and/or a text modification indicia. A text modification indicia indicates further stylistic aspects of the text, such as whether the extracted text is, for example, underlined, double underlined, italicized, bolded, stricken-through, all caps, small caps, etc.

Structural information may comprise, for example, names of identified candidate reusable graphic components, the coordinates of a synthetic-type identified candidate reusable graphic component or the size of a natural-type identified candidate reusable graphic component. An identified candidate reusable graphic component could have a name indicating, for example, that it is a line, a shape (e.g., triangle, rectangle, square, hexagon, arrow, etc.), a symbol, etc. In one example, the names of the identified candidate reusable graphic components could be extracted by an application programming interface such as Object Model Reference for Microsoft Office Systems. The coordinates represent the synthetic-type identified candidate reusable graphic component's location within the document. For example, the coordinates may consist of a {page, x, y} triplet. In this example, the page-coordinate might represent the section (e.g., page number or slide number) within the document 106 that the identified candidate reusable graphic component 503 is located in. The x-coordinate might represent the horizontal range within a particular section that the identified candidate reusable graphic component 503 is located in. Finally, the y-coordinate might represent the vertical range within a particular section that the identified candidate reusable graphic component 503 is located in. It is of course contemplated that this coordinate system may be modified as known in the art. The size of a natural-type identified candidate reusable graphic component represents the natural-type identified candidate reusable graphic component's size in relation to a structural characteristic of the document that the natural-type identified candidate reusable graphic component is contained in. The structural characteristics of the document may include, for example, the spatial dimensions of each section of the document containing an identified candidate reusable graphic component. Thus, in one example, a natural-type identified candidate reusable graphic component might have structural information associated with it indicating that the natural-type identified candidate reusable graphic component occupies ¼ of the spatial dimensions of a section (e.g., a slide) of the document 106 (e.g., a PowerPoint Presentation).

Visual information may comprise, for example, any of the following descriptors (or combinations thereof) of a natural-type identified candidate reusable graphic component: a color layout descriptor, a color structure descriptor, an edge histogram descriptor, a homogeneous texture descriptor, a dominant color descriptor, a scalable color descriptor, a texture browsing descriptor, a Gabor feature descriptor, a grey-level co-occurrence matrix descriptor, a region shape descriptor, a contour shape descriptor, a shape 3D descriptor, a SIFT descriptor (scale-invariant feature transform descriptor), a SURF descriptor (speeded up robust features descriptor), or any other suitable visual information known in the art.

The environment information extracting module 506 illustrated in FIG. 5 is operatively connected to the candidate reusable graphic identification module 502 and the reusable graphic synthesizing module 508. The environment information extracting module 506 accepts an identified candidate reusable graphic component 503 and a document 106 as input, and is operative to extract environment information 510 about each identified candidate reusable graphic component 503.

Extracted environment information 510 describes characteristics of the identified candidate reusable graphic component's 503 environment and may comprise, for example, text residing outside of the identified candidate reusable graphic component but within the document itself, text residing in metadata associated with the identified candidate reusable graphic component, text residing in metadata associated with the document containing the identified candidate reusable graphic component, and/or structural characteristics of the document. For example, one type of extracted environment information could be text located near an identified candidate reusable graphic component 503 (e.g., a square) in a document 106, but outside of the borders of the identified candidate reusable graphic component 503 (e.g., the square). As used herein, "text residing in metadata" refers to textual metadata describing either the identified candidate reusable graphic component 503 itself, or the document containing the identified candidate reusable graphic component 503. While not typically visible to a user looking at a hard copy (non-digital version) of a given document, this metadata can be stored either internally, in the same file as the data, or externally, in a separate file, as known in the art. As noted above, structural characteristics of the document 106 may comprise, for example, spatial dimensions of each section of the document 106 containing an identified candidate reusable graphic component 503.

The reusable graphic synthesizing module 508 illustrated in FIG. 5 is operatively connected to the feature information extracting module 504 and the environment information extracting module 506. The reusable graphic synthesizing module 508 accepts the extracted feature information 509 and the extracted environment information 510 as input, and is operative to synthesize (e.g., assemble) a reusable graphic from at least one identified candidate reusable graphic component 503 based on the extracted feature information 509 and the extracted environment information 510.

For example, in one scenario, the reusable graphic synthesizing module 508 will evaluate the extracted feature information 509 and the extracted environment information 510 associated with an identified candidate reusable graphic component 503 and determine that the identified candidate reusable graphic component 503 is itself a reusable graphic. In this example, the reusable graphic is synthesized, or assembled, from a single identified candidate reusable graphic component 503. In another scenario, the reusable graphic synthesizing module 508 will evaluate the extracted feature information 509 and the extracted environment information 510 associated with a plurality of identified candidate reusable graphic components and determine that the individual identified candidate reusable graphic components 503 should be consolidated to form a single reusable graphic.

For example, in one embodiment, the reusable graphic synthesizing module 508 will evaluate the coordinates of first and second synthetic-type identified candidate reusable graphic components to determine whether the first synthetic-type identified candidate reusable graphic component is placed over the second synthetic-type identified candidate reusable graphic component. If the first synthetic-type identified candidate reusable graphic component is placed over the second synthetic-type identified candidate reusable graphic component, the first and second synthetic-type identified candidate reusable graphic components are consolidated to form a single reusable graphic.

In another embodiment, the reusable graphic synthesizing module 508 will evaluate the coordinates of first and second synthetic-type identified candidate reusable graphic components to determine whether the first synthetic-type identified candidate reusable graphic component is within a predetermined distance from the second synthetic-type identified candidate reusable graphic component. In this embodiment, when the first and second synthetic-type identified candidate reusable graphic components are within the predetermined distance, the reusable graphic synthesizing module 508 consolidates them to form a single reusable graphic.

In yet another embodiment, the first and second synthetic-type identified candidate reusable graphic components will be consolidated into a single reusable graphic even though they are further apart than the predetermined distance if there is another synthetic-type identified candidate reusable graphic component (e.g., an arrow) between the first and second synthetic-type identified candidate reusable graphic components indicating that they are associated.

In yet another embodiment, when an identified candidate reusable graphic component is within a predetermined distance from another identified candidate reusable graphic component, the identified candidate reusable graphic components (either natural or synthetic) are consolidated into a single reusable graphic. Finally, first and second identified candidate reusable graphic components will be consolidated into a single reusable graphic even though they are further apart than the predetermined distance if there is another identified candidate reusable graphic component (e.g., an arrow) between the first and second identified candidate reusable graphic components indicating that they are associated.

Figure 6:
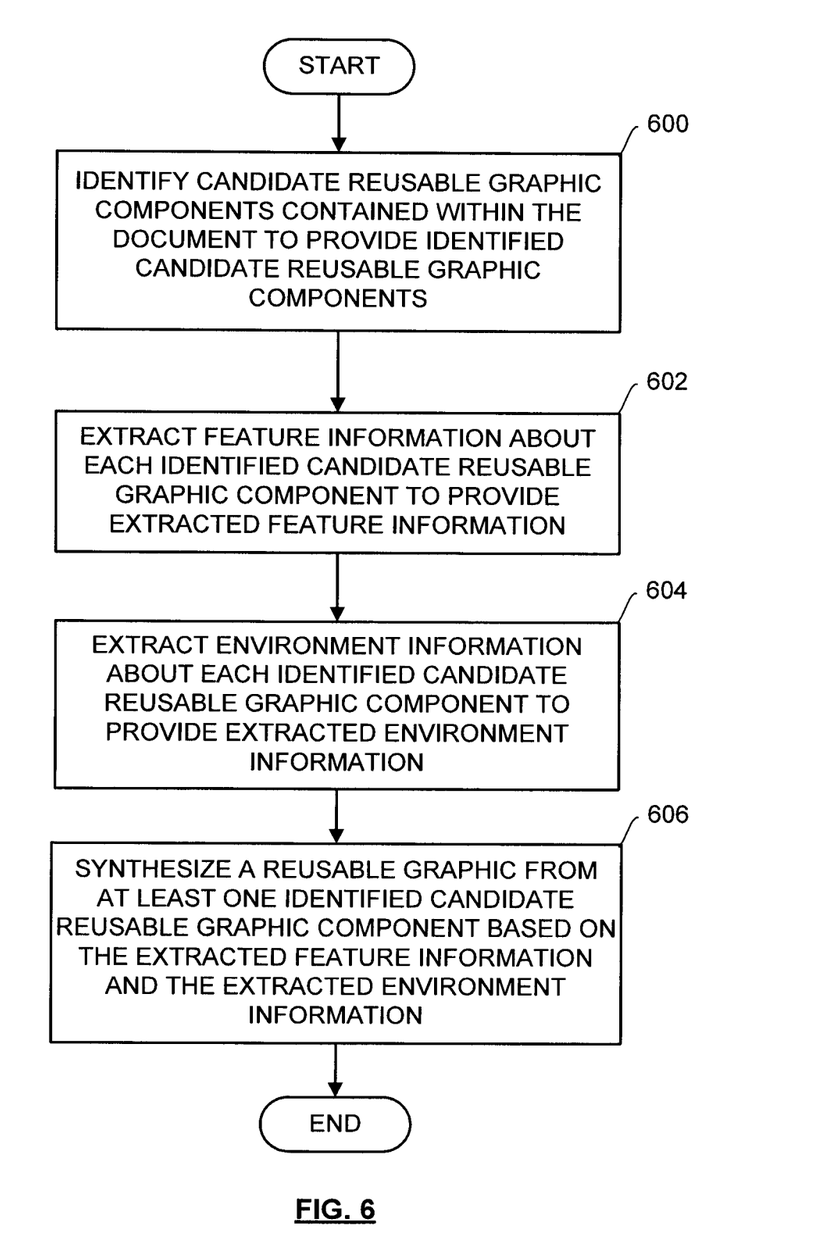
FIG. 6 is a flowchart illustrating a method for generating a reusable graphic from a document in accordance with one embodiment of the disclosure.

Referring now to FIG. 6, a flow chart illustrating a computer-implemented method for generating a reusable graphic from a document is provided in accordance with one embodiment of the present disclosure. For example, the processing illustrated in FIG. 6 may be carried out by the apparatus 500 illustrated in FIG. 5. At step 600, candidate reusable graphic components 501 contained within a document 106 are identified to provide identified candidate reusable graphic components 503. This step may be accomplished by the candidate reusable graphic identification module 502, for example, in accordance with its functionality as described above. At step 602, feature information about each identified candidate reusable graphic component 503 is extracted to provide extracted feature information 509. This step may be accomplished by the feature information extracting module 504, for example, in accordance with its functionality as described above. At step 604, environment information about each identified candidate reusable graphic component 503 is extracted to provide extracted environment information 510. This step may be accomplished by the environment information extracting module 506, for example, in accordance with its functionality as described above. At step 606, a reusable graphic is synthesized from at least one identified candidate reusable graphic component 503 based on the extracted feature information 509 and the extracted environment information 510. This step may be accomplished by the reusable graphic synthesizing module 508, for example, in accordance with its functionality as described above.

The present disclosure provides techniques for searching, retrieving, synthesizing, storing, and classifying graphics contained within documents. Previously, graphics contained within documents were difficult to retrieve, synthesize, and/or classify. As a result, the present disclosure enables graphics to be conveniently retrieved, synthesized, and repurposed for use in new applications.

While particular preferred embodiments have been shown and described, those skilled in the art will appreciate that changes and modifications may be made without departing from the instant teachings. It is therefore contemplated that any and all modifications, variations or equivalents of the above-described teachings fall within the scope of the basic underlying principles disclosed above and claimed herein.

What is claimed is:

1. A computer-implemented method for processing a reusable graphic in a document, the method comprising:
    extracting an identified graphic from the document to provide an extracted graphic;
    storing the extracted graphic in a reusable graphic repository;
    extracting at least one a structural feature, a textual feature, and a visual feature associated with the extracted graphic; and
    classifying the extracted graphic based on the extracted at least one structural feature, textual feature, and visual feature,
    wherein extracting the identified graphic from the document to provide the extracted graphic comprises:
    identifying candidate reusable graphic components contained within the document to provide identified candidate reusable graphic components, wherein each identified candidate reusable graphic component of the identified candidate reusable graphic components is a synthetic type or a natural type;
    extracting feature information about each identified candidate reusable graphic component to provide extracted feature information;
    extracting environment information about each identified candidate reusable graphic component's environment to provide extracted environment information;
    evaluating the extracted feature information and the extracted environment information associated with each identified candidate reusable graphic component to determine if individual candidate reusable graphic components are operable to be consolidated into a single reusable graphic, wherein the evaluating includes at least one of:
        determining whether a first of the candidate reusable graphic components is placed over a second of the candidate reusable graphic components in the document to determine whether the first and second candidate reusable graphic components are operable to be consolidated;
        determining whether the first candidate reusable graphic component is within a predetermined distance from the second candidate reusable graphic component in the document to determine whether the first and second candidate reusable graphic components are operable to be consolidated; and
        determining whether a third of the candidate reusable graphic components is between the first and the second candidate reusable graphic components to determine whether the first, second and third candidate reusable graphic components are operable to be consolidated; and
    synthesizing a single reusable graphic from a plurality of the first, second, and third candidate reusable graphic components based the evaluating on the extracted feature information and the extracted environment information.

2. The method of claim 1, further comprising extracting at least one textual feature from the document or the extracted graphic, extracting at least one visual feature from the extracted graphic, and classifying the extracted graphic based on the at least one extracted textual or visual feature.

3. The method of claim 2, wherein extracting the at least one textual feature includes extracting at least one of:
    text residing within the document containing the extracted graphic;
    text residing within the extracted graphic itself;
    text residing in metadata associated with the extracted graphic; and
    text residing in metadata associated with the document.

4. The method of claim 1, wherein extracting a structural feature, a textual feature, and a visual feature includes extracting at least one of:
    a name of at least one graphical construct element within the extracted graphic;
    coordinates of the at least one graphical construct element; and
    size of the extracted graphic in relation to a structural characteristic of the document.

5. The method of claim 1, wherein classifying the extracted graphic further comprises at least one of:
    classifying the extracted graphic using a supervised or semi-supervised classification algorithm; and
    classifying the extracted graphic based on a pre-defined taxonomy structure.

6. The method of claim 1, wherein identifying candidate reusable graphic components contained within the document comprises, for each identified candidate reusable graphic component:
    analyzing the identified candidate reusable graphic component to determine if at least one additional candidate reusable graphic component is within the identified candidate reusable graphic component; and
    when at least one additional candidate reusable graphic component is determined to be within the identified candidate reusable graphic component, treating each at least one additional candidate reusable graphic component as an identified candidate reusable graphic component.

7. The method of claim 1, wherein the extracted structural feature, textual feature, or visual feature information comprises at least one of:
    textual information;
    structural information; and
    visual information.

8. The method of claim 7, wherein the textual information comprises at least one of:
    text residing within a synthetic-type identified candidate reusable graphic component;
    text residing within a natural-type identified candidate reusable graphic component extracted using optical character recognition; and
    text format information comprising at least one of a font name associated with the extracted text; a font size associated with the extracted text; and a text modification indicia.

9. The method of claim 7, wherein the structural information comprises at least one of:

a name of an identified candidate reusable graphic component;

coordinates of a synthetic-type identified candidate reusable graphic component, representing the synthetic-type identified candidate reusable graphic component's location within the document; and size of a natural-type identified candidate reusable graphic component, representing the natural-type identified candidate reusable graphic component's size in relation to a structural characteristic of the document that the natural-type identified candidate reusable graphic component is contained in.

10. The method of claim 1, wherein the extracted environment information comprises at least one of:

text residing outside of the identified candidate reusable graphic component but within in the document itself;

text residing in metadata associated with the identified candidate reusable graphic component;

text residing in metadata associated with the document containing the identified candidate reusable graphic component; and structural characteristics of the document, comprising spatial dimensions of each section of the document containing at least one identified candidate reusable graphic component.

11. A non-transitory processor-readable memory having instructions stored thereon that, when executed, cause at least one processor to extract an identified graphic from a document to provide an extracted graphic;

store the extracted graphic in a reusable graphic repository;

extract at least one a structural feature, a textual feature, and a visual feature associated with the extracted graphic; and classify the extracted graphic based on the extracted at least one structural feature, textual feature, and visual feature, wherein those instructions that are operative to cause the at least one processor to extract the identified graphic from the document to provide the extracted graphic are further operative to cause the processor to:

identify candidate reusable graphic components contained within the document to provide identified candidate reusable graphic components, wherein each identified candidate reusable graphic component of the identified candidate reusable graphic components is a synthetic type or a natural type;

extract feature information about each identified candidate reusable graphic component to provide extracted feature information;

extract environment information about each identified candidate reusable graphic component's environment to provide extracted environment information;

evaluate the extracted feature information and the extracted environment information associated with each identified candidate reusable graphic component to determine if individual candidate reusable graphic components are operable to be consolidated into a single reusable graphic, wherein the evaluating the extracted feature information includes at least one of:

determining whether a first of the candidate reusable graphic components is placed over a second of the candidate reusable graphic components in the document to determine whether the first and second candidate reusable graphic components are operable to be consolidated;

determining whether the first candidate reusable graphic component is within a predetermined distance from the second candidate reusable graphic component in the document to determine whether the first and second candidate reusable graphic components are operable to be consolidated; and determining whether a third of the candidate reusable graphic components is between the first and the second candidate reusable graphic components to determine whether the first, second and third candidate reusable graphic components are operable to be consolidated; and synthesize a single reusable graphic from a plurality of the first, second and third identified candidate reusable graphic components based on the evaluating of the extracted feature information and the extracted environment information.

12. An apparatus for processing a reusable graphic in a document, the apparatus comprising:

a graphic extraction module, implemented by at least one processor, operative to extract an identified graphic from the document to provide an extracted graphic;

a reusable graphic repository, operatively connected to the graphic extraction module, operative to store the extracted graphic;

a feature extraction module, implemented by the at least one processor and operatively connected to the reusable graphic repository, operative to extract at least one a structural feature, a textual feature, and a visual feature associated with the extracted graphic; and a classification module, implemented by the at least one processor and operatively connected to the feature extraction module and the reusable graphic repository, operative to classify the extracted graphic based on the extracted at least one structural feature, textual feature, and visual feature, wherein the graphic extraction module further comprises:

a candidate reusable graphic identification module, implemented by the at least one processor, operative to identify candidate reusable graphic components contained within the document, wherein each identified candidate reusable graphic component of the identified candidate reusable graphic components is a synthetic type or a natural type;

a feature information extracting module, implemented by the at least one processor and operatively connected to the candidate reusable graphic identification module, operative to extract feature information about each identified candidate reusable graphic component;

an environment information extracting module, implemented by the at least one processor and operatively connected to the candidate reusable graphic identification module, operative to extract environment information about each identified candidate reusable graphic component; and a reusable graphic synthesizing module, implemented by the at least one processor and operatively connected to the feature information extracting module and the environment information extracting module, operative to evaluate the extracted feature information and the extracted environment information associated with each identified candidate reusable graphic component to determine if individual candidate reusable graphic components are operable to be consolidated into a single reusable graphic, wherein the evaluating of the extracted feature information includes at least one of:

determining whether a first of the candidate reusable graphic components is placed over a second of the candidate reusable graphic components in the document to determine whether the first and second candidate reusable graphic components are operable to be consolidated;

determining whether the first candidate reusable graphic component is within a predetermined distance from the second candidate reusable graphic component in the document to determine whether the first and second candidate reusable graphic components are operable to be consolidated; and determining whether a third of the candidate reusable graphic components is between the first and the second candidate reusable graphic components to determine whether the first, second and third candidate reusable graphic components are operable to be consolidated; and synthesize a single a reusable graphic from a plurality of the first, second and third candidate reusable graphic components based on the evaluating of the extracted feature information and the extracted environment information.

* * * * *

UNITED STATES PATENT AND TRADEMARK OFFICE
CERTIFICATE OF CORRECTION

| | | |
|---|---|---|
| PATENT NO. | : 8,862,583 B2 | Page 1 of 1 |
| APPLICATION NO. | : 13/230982 | |
| DATED | : October 14, 2014 | |
| INVENTOR(S) | : Djordjevic et al. | |

It is certified that error appears in the above-identified patent and that said Letters Patent is hereby corrected as shown below:

On the Title page, item (30) the foreign application priority number should read "10306055.4".

Signed and Sealed this
Sixth Day of January, 2015

Michelle K. Lee
*Deputy Director of the United States Patent and Trademark Office*